C. RUDOLPH.
STRENGTHENING FLEXIBLE METALLIC PIPES.
APPLICATION FILED FEB. 27, 1909.
1,000,627.
Patented Aug. 15, 1911.
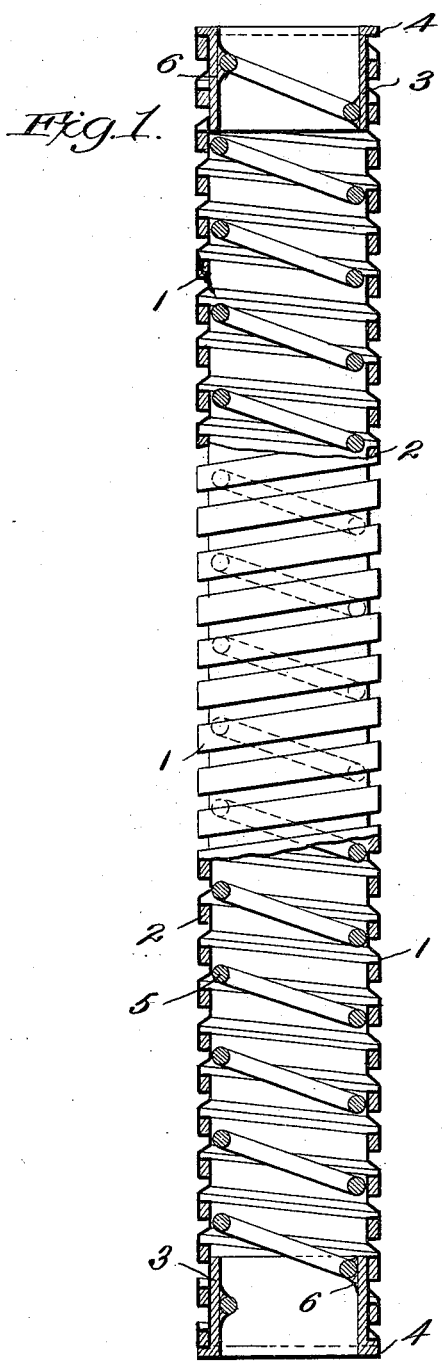
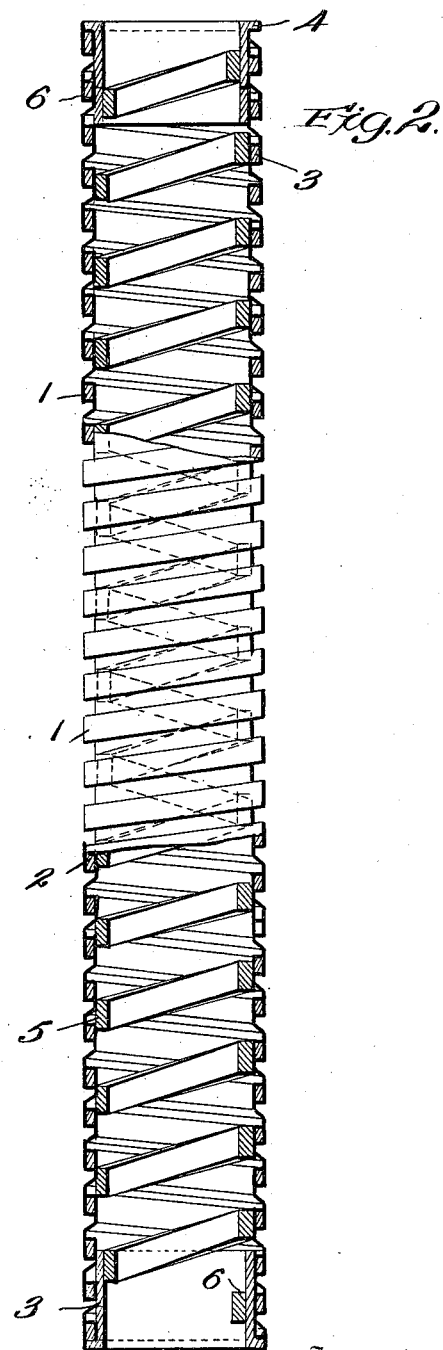
Witnesses
Edwin J Beller.
Geo A Byrne.
Inventor
Charles Rudolph,
By H S MacKaye
Attorney.

UNITED STATES PATENT OFFICE.

CHARLES RUDOLPH, OF PARIS, FRANCE, ASSIGNOR TO CHAS. T. SCHOEN, OF PHILADELPHIA, PENNSYLVANIA.

STRENGTHENING FLEXIBLE METALLIC PIPES.

1,000,627.  Specification of Letters Patent.  Patented Aug. 15, 1911.

Application filed February 27, 1909. Serial No. 480,363.

*To all whom it may concern:*

Be it known that I, CHARLES RUDOLPH, a citizen of the Republic of France, and a resident of 66 Rue du Théâtre, Paris, France, have invented certain new and useful Improvements for Strengthening Flexible Metallic Pipes, of which the following is a full, clear, and exact description, such as will enable others skilled in the art to which it appertains to carry out the same.

This invention relates to flexible metallic pipes and has for its object an arrangement for strengthening and consolidating flexible metallic pipes of that kind which are formed by a metal band suitably shaped for the purpose, being wound in a helix. When these pipes are subjected to more or less prolonged tension, the edges which are engaged one in the other are strained and the pipe deteriorated. In order to obviate this cause of deterioration, the invention consists in providing the pipe internally with a helically wound spring, the two ends of which are fixed to the pipe. When the pipe experiences a pull tending to elongate it, a portion of the tension is taken up by the internal spring, thus diminishing by this amount the strain on the interlocking edges.

In the accompanying drawings:—Figure 1 shows partly in section and partly in elevation a means for carrying out this invention; and Fig. 2 shows a modification.

In these figures the shaped strip which is wound in a helix to form the pipe is indicated by 1, and 2 indicates the elastic packing for insuring the tightness of the pipe. At the inside of the pipe at each end there is a ring 3, the edge of which is bent back at 4 so as to give it a bearing on the pipe.

In the interior of the pipe there is a helicoidal spring 5 of round section as shown in Fig. 1, or of rectangular section as shown in Fig. 2, the ends of which spring are fixed at 6 to each of the rings 3, by soldering or any other suitable means. It is evident that with this arrangement, if a pull be exerted on a pipe of comparatively small length, a portion of the tension will be taken up by the spring, which will diminish by so much the strain on the pipe. Although the rings 3 constitute the arrangement which has been considered to be preferable for attaching the extremities of the spring to the two ends of the pipe. This arrangement will find a special application in the couplings of the flexible pipes between railway carriages for pneumatic brakes, and for heating purposes. These flexible pipes have to support the weight of the coupling pieces intended for connecting them, and this weight exerts a strain on the pipes, which after a time results in strain of the pipes and wear of the interengaged edges of the helically wound band, which constitutes the pipe.

With the arrangement according to this invention, the spring takes up a portion of the pull exerted by the weight of the coupling pieces and thus diminishes the strain on the pipe.

This application is given merely as an example and it does not limit the uses to which the invention may be applied.

I am aware that helicoidal springs in the interior of flexible pipes have already been employed, for instance in the interior of canvas or india rubber pipes, but such use is made with the object of preventing the pipes collapsing, while the characteristic feature of my invention is to fix the helical spring at both extremities of the pipe formed by a shaped metal band wound in a helix, with the object of taking up a portion of the tension exerted in the direction of the axis of the pipe.

Having now particularly described and ascertained the nature of my said invention and in what manner the same is to be performed, I declare that what I claim is:

A flexible metallic pipe comprising a helical shaped metallic strip arranged with the edges of successive coils interlocking, in combination with collars 3 fitting within said metallic strip and having outwardly turned flanges 4 abutting upon the ends of said strip, and a helical spring within said pipe, lying against its inner surface and secured at its ends to said collars, 3, substantially as described.

In testimony I have hereunto set my hand in the presence of the two subscribing witnesses.

CHARLES RUDOLPH.

Witnesses:
FRANÇOIS DU BOISROUDRAY,
H. C. COXE.